June 15, 1948.  D. L. GAMBLE ET AL  2,443,383
PRODUCING CARBON DISULFIDE
Filed Aug. 7, 1945
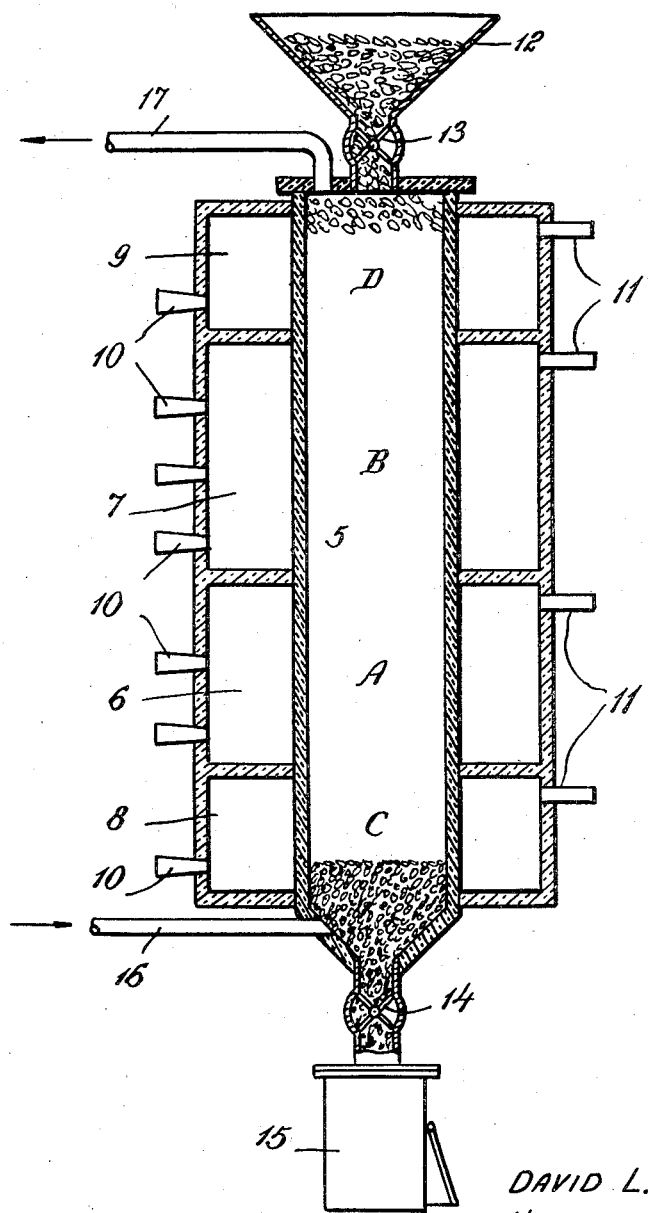
DAVID L. GAMBLE
HOWARD M. CYR
CHARLES W. SILLER
GAIUS W. BISBING
INVENTORS
BY Pennie, Davis, Marvin, Edmonds
ATTORNEYS Patented June 15, 1948

2,443,383

UNITED STATES PATENT OFFICE 2,443,383

PRODUCING CARBON DISULFIDE

David L. Gamble, Howard M. Cyr, and Charles W. Siller, Palmerton, and Gaius W. Bisbing, Lehighton, Pa., assignors to The New Jersey Zinc Company, New York, N. Y., a corporation of New Jersey Application August 7, 1945, Serial No. 609,462

9 Claims. (Cl. 23—206)

This invention relates to the production of carbon disulfide, and has for its object the provision of an improved method of producing carbon disulfide from sulfur dioxide and carbon.

Carbon disulfide is customarily produced commercially by treating a special type of preheated charcoal with sulfur vapor. It has long been recognized that carbon disulfide may be produced by reaction between sulfur dioxide and carbon, and various proposals have been made to utilize that reaction in the manufacture of carbon disulfide, but these have not, to our knowledge, made any commercial progress. This, we believe, has been due to the relatively low yield of carbon disulfide which has heretofore characterized its production from sulfur dioxide rather than sulfur vapor.

The present invention contemplates the production with yields of 70% and better of carbon disulfide from sulfur dioxide and carbon. We have found that the ultimate conversion of sulfur dioxide to carbon disulfide apparently proceeds in stages, the initial stage involving mainly the formation of carbon oxysulfide (COS), and a final stage involving mainly the conversion of carbon oxysulfide to carbon disulfide. We have observed that the formation of carbon oxysulfide and its conversion to carbon disulfide are favored and promoted at comparatively different temperatures, and we have found that when the formation and subsequent conversion of the carbon oxysulfide are carried out at these optimum temperatures a relatively high yield of carbon disulfide is obtained.

Based on these observations, the method of the present invention involves introducing sulfur dioxide into a body of carbon maintained at a temperature favoring the formation of carbon oxysulfide, and passing the gaseous products resulting from this initial reaction between sulfur dioxide and carbon into a further body of carbon maintained at a temperature favoring the conversion of carbon oxysulfide to carbon disulfide. The initial reaction in which sulfur dioxide reacts with carbon to form carbon oxysulfide is favored at temperatures of from 600 to 900° C. The following equations generally represent the reaction:

$$3C + 2SO_2 = 2COS + CO_2$$

$$2C + SO_2 = COS + CO$$

The conversion of carbon oxysulfide to carbon disulfide is favored at temperatures above 900° C. and proceeds rapidly at temperatures of 1150 to 1250° C. and higher, and is generally represented by the following equation:

$$2COS + C = CS_2 + 2CO$$

Thus, in accordance with the invention, sulfur dioxide is reacted with carbon at a temperature of 600 to 900° C., and the resulting gaseous products are reacted with further carbon at a temperature of 1100 to 1300° C., in the course of which reactions the sulfur dioxide is largely converted ultimately to carbon disulfide which is appropriately recovered. The method is advantageously carried out by maintaining the contemplated initial and final temperature zones in a column of carbon by externally heating the column. Thus, a current of pure sulfur dioxide, or a gas mixture containing sulfur dioxide such as roaster gas containing about 8% sulfur dioxide, about 8% oxygen and the remainder nitrogen (percentages by volume), is passed through a heated column of carbon such as charcoal or anthracite coal. The temperature of the carbon at the point where the gas enters the initial zone (carbon oxysulfide formation) is maintained at 600 to 900° C. by external heating. From the initial zone, the reaction gases pass to a final zone of the column maintained at a temperature above 1100° C., and preferably from 1150 to 1250° C., by external heating. It is not necessary that these temperature zones be sharply defined or definitely separated, and in practice the column of carbon may be maintained by external heating at a temperature gradient of from about 600° C. to 1300° C. The conversion of carbon oxysulfide to carbon disulfide proceeds rapidly at temperatures around 1250° C. and higher, and so far as the involved reactions are concerned there seems to be no critical upper temperature limit. However, practical considerations, such as the economic life of the available furnace refractories, place an upper limit of 1250–1300° C. on the high temperature zone.

The single figure of the accompanying drawing diagrammatically illustrates, in sectional elevation, a suitable apparatus for the practice of the invention in a continuous manner.

The apparatus of the drawing has an externally heated vertical retort 5, preferably made of silicon carbide. The retort is enclosed in a furnace structure provided with two separate main heating chambers 6 and 7 fired with gas, oil or other suitable fuel in conventional manner. An auxiliary heating chamber 8 surrounds the lower end of the retort below the heating chamber 6, and an auxiliary heating chamber 9 surrounds the upper end of the retort above the heating chamber 7. By way of illustration, the heating chambers are shown as fired by fuel burners 10, and with outlets 11 for exhaust products of combustion.

A charge hopper 12 having a substantially gastight feeding device 13 is mounted above the retort 5. The bottom of the retort is equipped with a discharge device 14 emptying into an ash pit or the like 15. The retort is provided with gas inlet and outlet pipes 16 and 17 at its bottom and top, respectively.

In practicing the invention in the apparatus of the drawing, the retort is filled with carbon and externally heated to maintain the contemplated initial and final temperature zones. Thus, the chamber 6 is fired to establish and maintain a temperature zone A of 600 to 1150° C., and the chamber 7 is fired to maintain a temperature zone B of 1150 to 1250° C. The temperature zones C and D of the carbon column, surrounded by the auxiliary heating chambers 8 and 9, respectively, are heat exchanging zones and ordinarily external firing is necessary only in starting the operation of the apparatus. The lower zone C is maintained at a temperature below 600° C., and the upper zone D is maintained at a temperature of 1250° C. to 600° C. and preferably somewhat lower.

When the contemplated temperature zones have been established in the carbon column, sulfur dioxide gas, or a suitable gas mixture containing sulfur dioxide in adequate amount (say 6% or more), is introduced into the bottom of the column through the pipe 16. In its passage upwardly through the lower temperature zone C, the sulfur dioxide is preheated and the progressively descending carbon column is correspondingly cooled. In passing upwardly through the initial reactive zone A, the preheated sulfur dioxide reacts with the hot carbon to form carbon oxysulfide (carbonyl sulfide). The gaseous products resulting from the reaction between sulfur dioxide and carbon in the zone A pass upwardly through the final reactive zone B where the carbon oxysulfide reacts further with the hotter carbon (particularly at 1150 to 1250° C.) to form carbon disulfide. The mechanism of this reaction is not precisely known, but it may be a decomposition of carbon oxysulfide to carbon monoxide and sulfur, followed by a reaction between the nascent sulfur and carbon to form carbon disulfide. In any event, a final yield of 70 to 90% carbon disulfide is obtained, based on the sulfur present in the sulfur dioxide used. The gaseous products of the reactions in the zone B pass upwardly through the zone D where they are cooled to a temperature preferably below 600° C. and the descending freshly charged carbon column is correspondingly heated. The carbon disulfide is recovered from the gases exiting or withdrawn from the top of the carbon column through the pipe 17 in any appropriate manner, as, for example, by refrigeration and consequent condensation of the carbon disulfide, or by scrubbing with liquid solvents (e. g. oils and the like) of carbon disulfide. After the carbon disulfide has been recovered or extracted from the exit gases, the residual gas may be advantageously used in firing the retort since it consists largely of carbon monoxide.

The carbon used in the practice of the invention may be anthracite coal, charcoal, activated carbon, or other active or black carbonaceous material. Inactive or gray carbon, such as metallurgical coke or graphite, are not suitable for the purposes of the invention. Anthracite coal is preferred because of its low cost. It is desirable to preheat the carbon to drive off moisture and volatile constituents, such as hydrocarbons, so that these will not enter the exit gas stream and contaminate the carbon disulfide. The temperature and duration of preheating is dependent upon the type of carbon used, temperatures of 500 to 800° C. for one to two hours being generally adequate. In the case of most anthracite coals, a preheating of two hours at 800° C. effectively conditions the coal for the purposes of the invention.

The carbon should be of such size as to provide a permeable column permitting free gaseous updraft. The only limitations to the size of the carbon are the necessity of adequate contact between carbon and gas and avoidance of excessive resistance to gas flow. In consequence, it is desirable to use a size of carbon or coal between egg size (which supplies too little surface) and dust size (which offers too great resistance to gas flow).

There appears to be some auto-activation of the carbon, and especially of anthracite coal, as a result of the action of the sulfur-bearing gases thereon. In a continuously operated process, such as hereinbefore described, the reactions occurring in the high temperature zone of the column apparently activate the carbon, thus accelerating the reactions in the lower temperature zone. Where the invention is practiced by batches, the over-all conversion of sulfur dioxide to carbon disulfide is more complete with partially used carbon than with fresh material. In a continuous operation in a vertical retort as hereinbefore described, the rate of feed of carbon may be (and preferably is) such that excess carbon is discharged from the bottom of the retort. This excess carbon is activated to a substantial extent by the reactions within the retort and may be used for certain purposes where active carbon is desired.

The unexpectedly high yield of carbon disulfide (from the reaction of sulfur dioxide and carbon) obtained in the practice of the invention is due primarily to the maintenance of controlled temperature zones providing optimum conditions for each step of the series of reactions taking place. Another contributing factor to this high yield is the pretreatment or preheating of the carbon, particularly in the case of anthracite coal. The active or black carbon is also a contributing factor. The auto-activation of the carbon further contributes to the high yield, and is most effectively utilized in the invention because of the maintenance of the controlled temperature zones.

We claim:

1. The method of producing carbon disulfide which comprises introducing sulfur dioxide into a body of active carbon maintained at a temperature of 600 to 900° C., passing the gaseous products resulting from the reaction between the sulfur dioxide and carbon into a further body of active carbon maintained at a temperature above 1100° C. whereby the initial sulfur dioxide is largely converted to carbon disulfide, and recovering carbon disulfide from the gases exiting from said further body of carbon.

2. The method of producing carbon disulfide from sulfur dioxide and carbon which comprises passing sulfur dioxide into a body of active carbon externally heated to provide an initial reactive zone at a temperature of 600 to 900° C.

and a succeeding reactive zone at a temperature in excess of 1100° C. whereby the initial sulfur dioxide is largely converted to carbon disulfide, withdrawing the gaseous products of the reaction from said higher temperature zone, and recovering carbon disulfide from said gaseous products.

3. The method of claim 2 in which the carbon is conditioned by preheating at a temperature of at least 500° C.

4. The method of claim 2 in which the carbon is anthracite coal conditioned by preheating to drive off moisture and volatile constituents.

5. The method of claim 2 in which the carbon is anthracite coal conditioned by preheating for about two hours at about 800° C.

6. The method of producing carbon disulfide which comprises maintaining by external heating a permeable column of active carbon at a temperature gradient of from about 600° C. to about 1250° C., introducing sulfur dioxide gas into said column at its low temperature end and passing the gaseous products resulting from the initial reaction between the carbon and sulfur dioxide through the remainder of the column in the course of which the sulfur dioxide is largely converted to carbon disulfide, and recovering carbon disulfide from the exit gases at the high temperature end of the column.

7. The method of producing carbon disulfide which comprises introducing sulfur dioxide into the bottom of a permeable vertical column of active carbon maintained by external heating at four approximate temperature zones ranging respectively in temperature from the bottom to the top of the column (1) up to 600° C., (2) from 600° C. to 1150° C., (3) from 1150° C. to about 1250° C., and (4) from about 1250° C. to less than 600° C., whereby the initial sulfur dioxide is largely converted to carbon disulfide, and recovering carbon disulfide from the gases exiting at the top of the column.

8. The method of claim 7 in which the carbon is preliminarily conditioned by preheating at a temperature of at least 500° C.

9. The method of claim 7 in which the carbon is anthracite coal preliminarily conditioned by preheating for about two hours at about 800° C.

DAVID L. GAMBLE.
HOWARD M. CYR.
CHARLES W. SILLER.
GAIUS W. BISBING.

REFERENCES CITED

The following references are of record in the file of this patent:

UNITED STATES PATENTS

| Number | Name | Date |
|---|---|---|
| 1,972,883 | Gleason et al. | Sept. 11, 1934 |
| 2,141,740 | Carter | Dec. 27, 1938 |

OTHER REFERENCES

Chemical Abstracts, article by Stock et al., vol. 18 (1924), page 1957.

"Inorganic and Theoretical Chemistry," by Mellor, vol. 6, Longmans Green and Co., N. Y. (1925), page 96.